US005200258A

United States Patent [19]

Tamagawa et al.

[11] Patent Number: 5,200,258

[45] Date of Patent: Apr. 6, 1993

[54] PHOTOGRAPHIC PRINTING PAPER SUPPORT

[75] Inventors: Shigehisa Tamagawa; Masafumi Kashiwagi, both of Shizuoka, Japan

[73] Assignee: Fuji Photo Film Co., Ltd., Kanagawa, Japan

[21] Appl. No.: 504,363

[22] Filed: Apr. 4, 1990

[30] Foreign Application Priority Data

Apr. 6, 1989 [JP] Japan .................................... 1-87277

[51] Int. Cl.$^5$ ........................ B32B 23/08; B32B 15/10; D21F 11/00

[52] U.S. Cl. .................................. 428/218; 428/425.1; 428/475.5; 428/479.3; 428/496; 428/513; 428/464; 162/206

[58] Field of Search ............... 428/513, 464, 218, 511, 428/425.1, 475.5, 479.3, 496; 162/206

[56] References Cited

U.S. PATENT DOCUMENTS

| | | | |
|---|---|---|---|
| 4,534,829 | 8/1985 | Ahrweiler et al. | 162/206 X |
| 4,670,102 | 6/1987 | Maurer et al. | 162/206 X |
| 4,738,197 | 4/1988 | Mälkiä162 | 206 X/ |
| 4,935,097 | 6/1990 | Tashiro et al. | 162/206 X |

FOREIGN PATENT DOCUMENTS

| | | |
|---|---|---|
| 0321561 | 6/1989 | European Pat. Off. . |
| 3619339 | 12/1986 | Fed. Rep. of Germany . |

OTHER PUBLICATIONS

Patent Abstracts of Japan, vol. 13, No. 226 (P-887)(3614), Jun. 20, 1989; and JP-A-0159230 (Fuji) Jun. 3, 1989.

*Primary Examiner*—P. C. Sluby

*Attorney, Agent, or Firm*—Sughrue, Mion, Zinn, Macpeak & Seas

[57] ABSTRACT

A support for used in photographic printing paper is provided comprising a base paper covered on both sides with polyolefin coating, said base paper being one which has undergone calender treatment between a metallic roll and a synthetic resin roll and then between a metallic roll and another metallic roll.

In a preferred embodiment, the calender treatment is performed at the final finishing process. The calender treatment between the metallic roll and the synthetic resin roll is performed in such a manner that the density of the paper is increased to from 0.70 to 1.00 g/cm$^3$ and the calender treatment between the metallic rolls is performed in such a manner that the density of the paper is increased to from 1.00 to 1.20 g/cm$^3$. The material of the synthetic resin roll is selected from the group consisting of urethane resin, ebonite resin, nylon resin, aramide resin and isocyanurate resin. The hardness of the synthetic resin roll is from 60 to 90, preferably 75 to 90 in terms of Shore hardness. The surface temperature of the synthetic resin roll and the metallic rolls are in the range of 30° to 150° C., preferably 50° to 100° C., and 50° to 250° C., preferably 70° to 150° C., respectively.

6 Claims, No Drawings

PHOTOGRAPHIC PRINTING PAPER SUPPORT

FIELD OF THE INVENTION

The present invention relates to a support for use in photographic printing paper, and more particularly, it is concerned with a photographic printing paper support having a good surface smoothness.

BACKGROUND OF THE INVENTION

In recent years, water-resistant photographic printing paper supports which consist of a base paper covered on both sides with a coating of a polyolefin such as polyethylene, have been frequently used for the rapid development of photographic printing paper.

Such photographic printing paper supports consisting of a base paper covered on both sides with a polyolefin coating include ones which have glossy surfaces, ones having matte surfaces, and ones whose surfaces have patterns such as a silk texture. Most advantageously employed of those are supports having smooth and glossy surfaces with no patterns, and particularly preferred are ones in which both surfaces have very few fine irregularities to give a mirror-like smoothness.

In obtaining such supports having a good surface smoothness, various papers have been proposed as a base for the supports. For example, JP-A-60-67940 discloses a base paper prepared by use of a pulp in which the content of voids not larger than 0.4 μm in diameter is 0.04 ml/g or more (The term "JP-A" as used herein means an "unexamined published Japanese patent application"); JP-A-60-69649 discloses a base paper prepared by use of a wood pulp having an average fiber length of 0.4 to 0.9 mm, an average fiber width of 13.5 μm or more, and an average fiber thickness of 4 μm or less; JP-A-61-275752 discloses a base paper prepared by use of a fiber mixture composed of a natural pulp and 5 to 60% hydrophobic fibers; and JP-A-61-284762 discloses a base paper prepared by a method in which when a wet web is obtained from a pulp slurry by means of a twin-wire paper machine, dehydration is conducted under specific conditions. Furthermore, there is also employed a method in which a base paper is subjected to calender treatment between a metal roll and another metal roll at an increased machine calender pressure, in order to densify the base paper which is used in a photographic printing paper support. On the other hand, for the coating of base papers with a polyolefin such as polyethylene, there generally is employed an extrusion coating process, in which a molten polyolefin is extruded at a high temperature over the surface of the base paper thereby to apply a coating. In order to improve the smoothness of the photographic printing paper supports, the above extrusion coating is performed in such an improved manner that the thickness of the polyolefin coating is increased or the pressure applied when the polyolefin coating is formed is increased.

However, the above improvements in the polyolefin coating process are not very effective and are also disadvantageous in regard to cost. Moreover, the above-described method to densify the base paper by means of machine calender treatment is also disadvantageous in that appearance defects such as blacking and cockles are apt to result therefrom. Accordingly, the above known methods cannot produce photographic printing paper supports having satisfactorily smooth surfaces, because of the presence of irregularities on the base paper. This applies of course to a base paper having irregularities on its front side, and also applies to a base paper having irregularities on its back side with the front side being smooth; in the latter case, the irregularities on the back side affect the polyolefin covering being extrusion-coated on the front side, depending upon the degree of the back side's irregularities.

SUMMARY OF THE INVENTION

The present inventors conducted intensive studies in order to solve the above drawbacks. As a result, they found that there are two kinds of irregularities on base paper; that is, wavelike large irregularities having wavelengths of around 5 mm (hereinafter referred to as "undulation") and dot-like small irregularities having wavelengths of around 0.5 mm (hereinafter referred to as "fine roughness"). Further studies were made based on this finding. As a result, it has turned out that even if base paper is subjected only to machine calender treatment between a metal roll and another metal roll, the "fine roughness" is difficult to remove without the occurrence of blacking etc., although the "undulation" can be removed, whereas just the supercalender treatment of base paper between a metal roll and a cotton roll cannot sufficiently remove the "undulation", although the "fine roughness" can be eliminated.

Furthermore, supercalender treatment is disadvantageous in regard to cost, because the rolls are prone to suffer damage so that the on-machine use (continuous running) of supercalenders is difficult.

The present inventors tried a soft calender treatment employing a synthetic resin roll instead of the conventional supercalender treatment. As a result, it was found that this soft calender treatment makes it possible to remarkably eliminate "fine roughness". It was also found that this soft calender treatment is excellent in the effect of eliminating "undulation" as compared to the supercalender treatment. It was further found that when the soft calender treatment employing a synthetic resin roll is followed by a machine calender treatment employing a metallic roll, a further excellent result can be obtained. Thus, the present invention could be accomplished.

It is therefore an object of the present invention to provide a photographic printing paper support with a sufficient smoothness which can be easily prepared without blacking or cockles.

These objects of the present invention are accomplished with a photographic printing paper support comprising a base paper covered on both sides with a polyolefin coating, said base paper being one which has undergone calender treatment between a metallic roll and a synthetic resin roll and then between a metallic roll and another metallic roll.

DETAILED DESCRIPTION OF THE INVENTION

The present invention will be explained below in detail.

The base paper to be employed in the photographic printing paper support according to the present invention can be obtained by forming a paper sheet from a pulp slurry which may comprise a natural pulp, as the base material, which is selected from among coniferous wood pulps, deciduous wood pulps, and others, and also comprises chemical additives which will be described later.

As the pulp slurry, a synthetic pulp, which is made, for example, of polyethylene or polypropylene, may be used in place of the natural pulp, or a base material which consists of a mixture of a natural pulp and a synthetic pulp in arbitrary proportions may be used. It is preferable that the deciduous wood pulp, which has short fibers, constitute 60% by weight or more of the base material.

For more effectively producing the desired effects of this invention, it is preferable that a pulp having an α-cellulose content of at least 90% constitute 25% by weight or more, more preferably 50% by weight or more, of the base material in the pulp slurry.

Further, the degree of beating of the pulp is preferably from 200 to 500 cc C.S.F. (Canadian Standard Freeness), more preferably from 250 to 350 cc C.S.F.

The chemicals to be added to the pulp may include fillers such as clay, talc, calcium carbonate, and urea resin fine particles; sizing agents such as rosin, alkylketene dimers, salts of higher fatty acids, paraffin wax, and alkenylsuccinic acids; paper-strength improvers such as polyacrylamide; and fixing agents such as aluminum sulfate and aluminum chloride.

If necessary, other additives may be incorporated such as dyes, fluorescent dyes, slime control agents, and defoamers. If desired and necessary, a softening agent selected from those described below may further be incorporated, whereby the effects of the invention can be brought about more effectively.

A description of softening agents is given in, for example, "Shin Kami Kako Binran (New Paper Processing Handbook)", edited by Shigyo Times Company, pp. 554–555, published in 1980. Particularly preferred softening agents are ones having a molecular weight of 200 or more, and specifically, ones which contain a hydrophobic group having 10 or more carbon atoms and also contain an amine salt or quaternary ammonium salt which have the property of self-fixing on cellulose. Examples of such softening agents include a product of the reaction of a maleic anhydride copolymer with a polyalkylene polyamine, a product of the reaction of a higher fatty acid with a polyalkylene polyamine, a product of the reaction of an urethane alcohol with an alkylating agent, and a quaternary ammonium salt of a higher fatty acid. Particularly preferred of these is the product of the reaction of a maleic anhydride copolymer with a polyalkylene polyamine and the product of the reaction of an urethane alcohol with an alkylating agent.

The base paper may be surface-sized with a film-forming polymer such as gelatin, starch, carboxymethyl cellulose, polyacrylamide, polyvinyl alcohol, or modified polyvinyl alcohol. Such modified polyvinyl alcohols include, for example, carboxyl-modified polyvinyl alcohol, silanol-modified polyvinyl alcohol, and a copolymer of vinyl alcohol with acrylamide. The preferred film-forming polymer used in the present invention is polyvinyl alcohol or carboxyl-modified polyvinyl alcohol. Where surface-sizing treatment with a film-forming polymer is performed, the film-forming polymer may be applied at a coating weight of from about 0.1 to 5.0 $g/m^2$, preferably from 0.5 to 2.0 $g/m^2$. If necessary, an antistatic agent, a fluorescent brightener, a pigment, an anti-foaming agent, etc. may be incorporated into the film-forming polymer to be used in the surface sizing.

The base paper may be produced by forming a wet paper sheet from a pulp slurry comprising the above-described pulp and additives, and added thereto if necessary, a filler, a sizing agent, a paper-strength improver, a fixing agent, etc. by means of a paper machine such as a wire paper machine, subsequently drying the wet sheet, and then reeling up the dry sheet. Either before or after the drying, the above-described surface-sizing treatment may be performed, while calender treatment may be performed between the drying and the reeling. In the case where the surface-sizing treatment is performed after the drying, the calender treatment may be conducted either before or after the surface-sizing treatment. It is, however, preferable that the calender treatment according to this invention be performed at the final finishing stage after the other various treatments, so as to effectively accomplish the objects of the present invention.

In the present invention, the calender treatment comprises a soft calender treatment process between a metallic roll and a synthetic resin roll and a subsequent machine calender treatment process between a metallic roll and another metallic roll. Specifically, "undulation" and "fine roughness" are both removed by the synthetic resin roll to give smoothness to the base paper. Another calender treatment is subsequently performed between the metallic rolls to adjust the thickness of the base paper and further remove "undulation".

In this case, the soft calender treatment is preferably performed between the metallic roll and the synthetic resin roll to increase the density of the material to from 0.70 to 1.00 $g/cm^3$. The machine calender treatment is preferably performed between the metallic rolls to increase the density of the base paper from 1.00 to 1.20 $g/cm^3$.

The base paper to be used as the photographic printing paper support of the present invention is subjected to the above mentioned calender treatment to a thickness from 50 to 250 μm.

If the machine calender treatment is performed only until the density of the base paper is increased to 1.06 $g/cm^3$ to provide a sufficient smoothness, blacking develops, marring the external appearance of the base paper obtained. Similarly, if the calender treatment is performed in such a manner that the density of the base paper is not increased to 1.06 $g/cm^3$, "fine roughness" cannot be removed.

On the other hand, if only the soft calender treatment is performed, the adjustable thickness of the base paper is limited and "undulation" cannot be sufficiently removed.

As a metal roll employed according to the invention, known metal rolls, preferably a hard chromium-plated metal roll having 0.5 s or less of surface roughness, can be used.

As the synthetic resin roll employed according to the invention, one composed of a metal roll and a synthetic resin covered thereon, can be used. Examples of the synthetic resin include a urethane type, ebonite type, nylon type, aramid type, isocyanurate type, polyether type, or rubber type.

The coating thickness of the synthetic resin constituting the synthetic resin roll may be about 5 to 50 mm, preferably 10 to 30 mm and the diameter (r) of the synthetic resin roll may be about 200 to 1,000 mm, preferably 300 to 800 mm. The hardness of the synthetic resin may be from about 60 to 90, preferably from 75 to 90, in terms of Shore D hardness. In performing the calender treatment, the moisture content of the base paper being subjected to the calender treatment is preferably from 6.0 to 9.0%, and the surface temperature of the synthetic resin roll is preferably from 30° to 150° C., more preferably from 70° to 150° C. The surface temperature of the metal roll is preferably from 50° to 250° C., more preferably from 70° to 150° C.

The base paper thus obtained is then covered on both sides with a polyolefin coating, thereby giving a photographic printing paper support of this invention.

Such polyolefin resins include, for example, homopolymers of α-olefins, such as polyethylene and polypropylene, and mixtures of various polymers of the above kind. Particularly preferred polyolefins are high-density polyethylene, low-density polyethylene, and mixtures thereof. These polyolefins are not particularly limited in molecular weight as long as they can be extrusion-coated. Generally, however, a polyolefin having a molecular weight in the range of from about 20,000 to 200,000 is employed.

The thickness of the polyolefin resin coating is not particularly limited and it can be fixed in accordance with the thicknesses of the polyolefin resin coatings in conventional printing paper supports. In general, the preferred range of the thickness thereof is from 15 to 50 μm, preferably 20 to 40 μm.

The polyolefin resin coating may contain a white pigment, a coloring pigment, or other known additives such as a fluorescent brightener, an antioxidant, etc. It is preferable that a white pigment and a coloring pigment be incorporated particularly in the polyolefin coating on the base paper's front side to which a photographic emulsion is to be applied.

As apparatuses for use in extrusion-coating the polyolefin, an extruder and a laminator which are ordinarily employed with polyolefins may be used.

The photographic printing paper support of the present invention is further coated on one side with a photographic emulsion layer, which is then dried, thus giving a photographic printing paper. However, various modifications can be made to the photographic printing paper support. For example, a print storage layer of the type disclosed in JP-A-62-6256 may be provided on the other side of the support opposite the emulsion layer.

According to the present invention, since the base paper to be used in a photographic printing paper support has sufficiently smooth surfaces from which various irregularities, including large and small ones, have been removed, a photographic printing paper support excellent in surface smoothness can be easily obtained by coating the base paper on both sides with a polyolefin thin layer. The photographic printing paper support thus obtained has smooth surfaces free from blacking and cockles and has no cost problems and, therefore, it can be advantageously used in glossy photographic printing paper.

The present invention will now be explained in more detail by reference to the following examples, which should not be construed to be limiting the scope of the invention.

Unless otherwise specified, all percents, ratios, parts, etc. are by weight.

EXAMPLE 1

A wood pulp consisting of 80 parts of LBKP and 20 parts of NBSP was beaten by a disc refiner to a canadian freeness of 300 cc. Thereto were added 1.0 part of sodium stearate, 1.0 part of anionic polyacrylamide, 1.5 part of aluminum chloride, 0.3 part of polyamide polyamine epichlorohydrin and 0.3 part of alkylketene dimer, each amount being relative to 100 parts by oven-dry weight of the wood pulp. A paper sheet having a weight of 180 $g/m^2$ was made from the material by means of a wire paper machine.

The paper sheet was then subjected to soft calender treatment by an urethane resin roll having a Shore hardness of 89 and a surface temperature of 60° C. and a metallic roll having a surface temperature of 100° C. so that the density of the paper increased to 0.85 $g/cm^3$. The paper was further subjected to machine calender treatment by metallic rolls having a surface temperature of 70° C. until the density thereof became 1.06 $g/cm^3$. The base paper thus obtained had a water content of 8.0%.

The base paper thus obtained was then measured by a surface roughness analyzer (Model SE-3AK, manufactured by Kosaka Laboratory, Japan) with a contact finger (R=2 μm) for center plane average roughness ($SRa = 1/S_M \int_0^L \int_0^L |f(X,Y)| d_X d_Y$, in which $S_M = L_X L_Y$) at a wavelength of 0.2 to 1.6 mm and at a wavelength of 1.6 to 6.4 mm. The results were 0.58 μm and 0.54 μm at a wavelength of 0.2 to 1.6 mm and at a wavelength of 1.6 to 6.4 mm, respectively.

Polyethylene was then coated on both sides of the base paper in an extrusion coating process by means of a laminator to a thickness of 28 μm. In this process, the surface of the cooling roll for producing the polyethylene layer at the photographic emulsion side served as a mirror surface to obtain a water-resistant glossy support. The support thus obtained was then coated with an ordinary gelatin-containing silver halide photographic emulsion. The photographic paper was then exposed to light, and developed, and surface smoothness thereof was visually evaluated by using reflected light in accordance with the following 5-step criterion. The result was determined to be 4.5 in the 5-step criterion.

Criterion for Surface Smoothness

1: Very poor
2: Poor
3: Medium
4: Good
5: Excellent

EXAMPLE 2

A base paper was prepared in the same manner as in Example 1 except that the soft calender treatment was performed by an urethane resin roll having a Shore hardness of 91 and a surface temperature of 70° C. and a metallic roll having a surface temperature of 120° C. to increase the density of the paper to 0.91 $g/m^3$ and the machine calender treatment was performed by metallic rolls having a surface temperature of 90° C. until the density of the paper became 1.08 $g/cm^3$. The base paper thus obtained had a water content of 7.8%.

The base paper thus obtained was then measured in the same manner as in Example 1 for center plane average roughness at a wavelength of 0.2 to 1.6 mm and at a wavelength of 1.6 to 6.4 mm and for smoothness. The center plane average roughness was 0.49 μm and 0.56 μm at a wavelength of 0.2 to 1.6 mm and at a wavelength of 1.6 to 6.4 mm, respectively. The smoothness was 5 in the 5-step evaluation. Thus, the base paper exhibited extremely excellent properties.

EXAMPLE 3

A wood pulp consisting of 70 parts of LBKP, 10 parts of LBSP and 20 parts of NBSP was beaten by a disc refiner to a canadian freeness of 290 cc. Thereto were added 0.8 part of sodium stearate, 1.2 part of anionic polyacrylamide, 1.5 parts of aluminum sulfite, 0.3 part of polyamide polyamine epichlorohydrin and 0.5 part of epoxidated aliphatic amide, each amount being relative to 100 parts by oven-dry weight of the wood pulp. A paper sheet having a weight of 180 $g/m^2$ was made from the material by means of a wire paper machine. The paper sheet was then subjected to soft calender treatment by a rubber resin roll having a Shore hardness of 87 and a surface temperature of 60° C. and a metallic roll having a surface temperature of 100° C. to increase the density of the paper to 0.87 $g/cm^3$. The paper was further subjected to machine calender treatment by metallic rolls having a surface temperature of 100° C. until the density of the paper became 1.10 $g/cm^3$. The base paper thus obtained had a water content of 7.5%.

The base paper thus obtained was then measured in the same manner as in Example 1 for center plane average roughness at a wavelength of 0.2 to 1.6 mm and at a wavelength of 1.6 to 6.4 mm and for smoothness. The results were 0.47 μm and 0.50 μm at a wavelength of 0.2 to 1.6 mm and at a wavelength of 1.6 to 6.4 mm, respectively. The smoothness was 5. Thus, the base paper exhibited extremely excellent properties.

COMPARATIVE EXAMPLE 1

A base paper was prepared in the same manner as in Example 1 except that only a machine calender treatment was performed by metallic rolls having a surface temperature of 70° C. until the density of the paper became 1.10 $g/cm^3$. The base paper thus obtained had a water content of 8.0%.

The base paper thus obtained exhibited blacking and thus was obviously apparently undesirable. For comparison, the base paper was measured in the same manner as in Example 1 for center plane average roughness at a wavelength of 0.2 to 1.6 mm and at a wavelength of 1.6 to 6.4 mm and for smoothness. The center plane average roughness was 0.82 μm and 0.53 μm at a wavelength of 0.2 to 1.6 mm and at a wavelength of 1.6 to 6.4 mm, respectively. The smoothness was only 3.

COMPARATIVE EXAMPLE 2

A base paper was prepared in the same manner as in Comparative Example 2 except that the machine calender treatment was replaced by super calender treatment by a cotton roll having a Shore hardness of 82 and a surface temperature of 60° C. and a metallic roll having a surface temperature of 90° C. until the density of the paper became 1.05 $g/cm^3$. The base paper thus obtained had a water content of 7.9%.

The base paper thus obtained was measured in the same manner as in Example 1 for center plane average roughness at a wavelength of 0.2 to 1.6 mm and at a wavelength of 1.6 to 6.4 mm and for smoothness. The center plane average roughness was 0.60 μm and 1.01 μm at a wavelength of 0.2 to 1.6 mm and at a wavelength of 1.6 to 6.4 mm, respectively. The smoothness was only 3.

The results of Examples 1 to 3 and Comparative Examples 1 and 2 are set forth in Table 1.

TABLE 1

| | Center Plane Average Roughness at Each Wavelength | | Smoothness of printed surface |
|---|---|---|---|
| | 0.2-1.6 mm (μm) | 1.6-6.4 mm (μm) | |
| Example 1 | 0.58 | 0.54 | 4.5 |
| Example 2 | 0.49 | 0.56 | 5 |
| Example 3 | 0.47 | 0.50 | 5 |
| Comparative Example 1 | 0.82 | 0.53 | 3 |
| Comparative Example 2 | 0.60 | 1.01 | 3 |

Table 1 shows that the photographic paper comprising a photographic paper according to the present invention exhibits an extremely excellent smoothness.

While the invention has been described in detail and with reference to specific embodiments thereof, it will be apparent to one skilled in the art that various changes and modifications can be made therein without departing from the spirit and scope thereof.

What is claimed is:

1. A support for use in photographic printing paper comprising a base paper which is covered on both sides with a polyolefin coating, said base paper being one which has undergone calender treatment between a metallic roll and a synthetic resin roll and then between a metallic roll and another metallic roll,
   - wherein said calender treatment between the metallic roll and the synthetic resin roll is performed in such a manner that the density of the paper is increased to a range from 0.70 to 1.00 $g/cm^3$ and said calender treatment between the metallic rolls is performed in such a manner that the density of the paper is increased to a range from 1.00 to 1.20 $g/cm^3$, and
   - wherein said calender treatment is performed at the final finishing process.

2. The support for use in photographic printing paper as claimed in claim 1, wherein the material of said synthetic resin roll is selected from the group consisting of urethane resin, ebonite resin, nylon resin, aramide resin and isocyanurate resin.

3. The support for use in photographic printing paper as claimed in claim 1, wherein the hardness of said synthetic resin roll is from 60 to 90 in terms of Shore hardness.

4. The support for use in photographic printing paper as claimed in claim 3, wherein the hardness of said synthetic resin roll is from 75 to 90 in terms of Shore hardness.

5. The support for use in photographic printing paper as claimed in claim 1, wherein the surface temperature of said synthetic resin roll and said metallic roll are in the range of from 30° to 150° C. and from 50° to 250° C., respectively.

6. The support for use in photographic printing paper as claimed in claim 1, wherein the surface temperature of said synthetic resin roll and said metallic roll are in the range of from 50° to 100° C., and from 70° to 150° C., respectively.

* * * * *